United States Patent [19]
Murakami
[11] Patent Number: 4,967,462
[45] Date of Patent: Nov. 6, 1990

[54] METHOD OF MANUFACTURING AN INTEGRATED LIGHT-WEIGHT SOLID METAL SHAFT AND AN INTEGRATED LIGHT-WEIGHT METAL PIPE SHAFT FOR USE IN A BUSINESS MACHINE, AND THE INTEGRATED LIGHT-WEIGHT SOLID METAL SHAFT AND A SIMILAR PIPE SHAFT MANUFACTURED BY THE SAME METHOD

[76] Inventor: Yukiyoshi Murakami, 11-16, Minamiurawa 3-chome, Urawa City, Saitama, Japan

[21] Appl. No.: 343,254
[22] Filed: Apr. 26, 1989
[51] Int. Cl.$^5$ .............................................. B23P 11/02
[52] U.S. Cl. ...................................... 29/432.1; 29/508
[58] Field of Search .................... 29/432.1, 432.2, 458, 29/508, 522, 522.1; 72/283

[56] References Cited

U.S. PATENT DOCUMENTS

| | | | |
|---|---|---|---|
| 171,440 | 12/1875 | Smith | 29/508 |
| 2,886,170 | 5/1959 | Kerr | 72/283 |
| 3,672,201 | 6/1972 | Hinshaw | 72/283 X |
| 4,270,690 | 6/1981 | Mabery et al. | 72/283 X |
| 4,403,385 | 9/1983 | Kirk | 29/508 X |
| 4,541,659 | 9/1985 | Nakamura | 29/508 X |
| 4,691,550 | 9/1987 | Dietzel | 29/508 X |
| 4,854,148 | 8/1989 | Mayer | 72/283 X |

*Primary Examiner*—Timothy V. Eley
*Assistant Examiner*—Frances Chin
*Attorney, Agent, or Firm*—Wenderoth, Lind & Ponack

[57] ABSTRACT

A method of manufacturing an integrated light-weight solid metal shaft for use in a business machine by the steps of subjecting to acid treatment an inner periphery of a seam welded outer metal pipe having high hardness, subject to alkali cleaning an external periphery of an inner cylindrical member such as a solid cylindrical bar or pipe, having both low hardness and weight, inserting the inner cylindrical member into the outer metal pipe, cold drawing forcedly the thus assembled outer metal pipe and inner cylindrical members through a reducing die in order to wrinkle the inner periphery of the outer metal pipe and then integrate tightly the solid cylindrical bar onto the wrinkled inner periphery of the outer metal pipe through plastic deformation of the outer metal pipe and the solid cylindrical bar, internal pressure between the outer metal pipe and the inner cylindrical member and internal heat in the outer metal pipe and the inner cylindrical member caused by plastic deformation.

3 Claims, 5 Drawing Sheets

METHOD OF MANUFACTURING AN INTEGRATED LIGHT-WEIGHT SOLID METAL SHAFT AND AN INTEGRATED LIGHT-WEIGHT METAL PIPE SHAFT FOR USE IN A BUSINESS MACHINE, AND THE INTEGRATED LIGHT-WEIGHT SOLID METAL SHAFT AND A SIMILAR PIPE SHAFT MANUFACTURED BY THE SAME METHOD

BACKGROUND OF THE INVENTION

1. Field of the Invention

The present invention relates to a method of manufacturing an integrated light-weight solid metal shaft and an integrated light weight-weight metal pipe shaft for use in a business machine,and an integrated light weight solid metal shaft and a similar pipe shaft manufactured by the same method.

2. Description of the Prior Art

A drive shaft for reciprocally mounting a print head and a paper feed roller of a business machine are generally constructed as a solid metal shaft.

It has been proposed to use a metal pipe shaft in such a drive shaft and a paper feed roller in order to decrease weight or to save material.

The conventional pipe shaft having a small thickness for a drive shaft of a print head and a carriage is weak in strength and the printing pressure of the printer causes disarrangement and resonance of the pipe drive shaft, causing mutilation of the printed letters and characters.

When a thin pipe shaft is used for a paper feed roller, it is difficult to mount coaxially each end bearing portion of the pipe shaft with an outer periphery of an inner shaft, thus causing vibration of the drive pipe shaft and also backlash between the gears and the drive pipe shaft during rotation thereof. When the press-fitted portion of the drive pipe shaft is strengthened, it has a large volume and becomes unsuitable for a drive shaft.

BRIEF SUMMARY OF INVENTION

OBJECTS OF THE INVENTION

It is the primary object of the present invention to provide a method of manufacturing an integrated light-wight solid metal shaft and an integrated light-weight metal pipe shaft for use in a business machine which is capable of eliminating the above-mentioned drawbacks of the prior art and which is a good drive shaft or a paper feed roller.

Another object of this invention is to provide a method whereby an integrated light-weight metal solid shaft and an integrated light weight metal pipe shaft for use in a business machine can be manufactured easily and uniformly.

Another object of this invention is to provide an integrated light-weight solid metal shaft which comprises a hard outer metal pipe and a light-weight metal cylinder fitted integrally into the outer metal pipe.

Another object of this invention is to provide an integrated light-weight metal pipe shaft which comprises a hard outer metal pipe and light-weight metal pipe shaft fitted integrally into the outer pipe.

Another object of this invention is to provide an integrated light-weight solid metal shaft and an integrateded light-weight metal pipe which are damping, rigid and durable, and may be preferably used for a drive shaft of a print head and a paper feed roller of a business machine.

Another object of this invention is to provide an integrated light weight solid shaft and a similar pipe shaft which are highly corrosive resistant and which save material. Another object of this invention is to provide an integrated light-weight solid shaft and a similar pipe shaft whereby a print head can be reciprocally and smoothly driven without distortion of the shaft. Another object of this invention is to provide a paper feed roller of a business machine whereby the paper feed roller can be rotated without any vibration thereof.

Another object of this invention is to provide an integrated drive shaft for a print head of a business machine which comprises a hard outer metal pipe and a light-weight solid metal pipe fitted integrally into a longitudinal opening of the hard outer metal pipe whereby resonance of the drive shaft can be greatly decreased.

Another object of this invention is to provide an integrated drive shaft for a print head of a business machine whereby possible noise produced when the print head is impacted on a platen or the print head is slidably moved along the drive shaft can be decreased as much as possible.

Another object of this invention is to provide an integrated light-weight drive shaft of a business machine whereby a motor can be driven with moderate energy.

Another object of this invention is to provide an integrated drive shaft of a business machine whereby each end bearing portion can be easily machined with an outer hard metal pipe as its center, the hard outer metal pipe can be easily arranged coaxial with an inner light-weight solid cylinder or pipe fitted integrally into the outer metal pipe so that vibration of the drive shaft during rotation thereof does not occur. thus having no effect on gear-meshing and rotation of the motor.

Another object of this invention is to provide an integrated light-weight solid metal shaft and a similar metal pipe shaft which have high damping effect and decrease gear noise remarkably during driving of a paper feed roller.

Another object of this invention is to provide an integrated light-weight shaft for use in a business machine hereby the light-weight of the drive shaft is of advantage to the intensity test thereof when the drive shaft is mounted on a chassis, and the weight of the strengthened drive shaft can be decreased.

Still another object of this invention is to provide an integrated light-weight shaft for use in a business machine whereby the weight of the business machine can be decreased and the cost of product can be lowered as well.

BRIEF DESCRIPTION OF THE DRAWINGS

The above description, as well as further objects, features and advantages of the present invention will be more fully understood by reference to the following detailed description of a presently preferred, but nonetheless illustrative light-weight drive shaft of a business machine in accordance with the present invention when taken in conjunction with the accompanying drawings, wherein:

FIG. 3 is a partially sectional view of FIG. 2A, taken on line III13 III;

DETAILED DESCRIPTION OF THE PREFERRED EMBODIMENT

Figure 6:
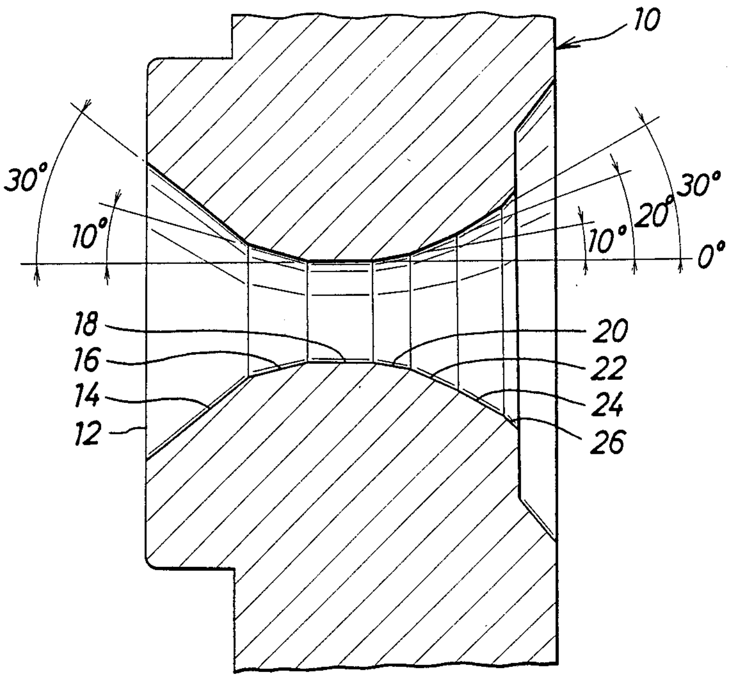
FIG. 6 is a greatly enlarged section view of a reducing die used in the methods shown in FIGS. 1 and 4.

Referring first to FIG. 6, a reducing die 10 comprises an inlet portion 12 having a tapered periphery 14 at almost a 30-degree angle, a tapered periphery 16 at almost a 10-degree angle, a minimum cylindrical reducing portion 18 located at the middle portion of the die 10, a tapered periphery 20 at almost a 10-degree angle, a tapered periphery 22 at almost a 20 ° angle, a tapered periphery 24 at almost a 30-degree angle and an outlet portion 26 which are shaped in the stated order.

Figure 2A:
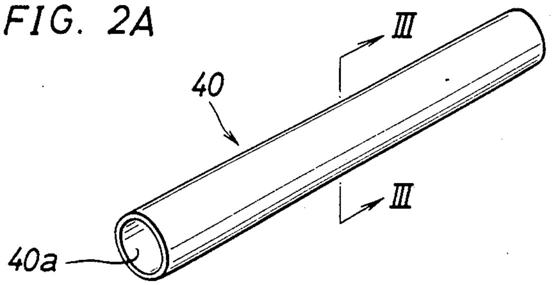
FIG. 2A, 2B, 2C, 2D and 2E are perspectiver views, partly in section, of the light-weight solid drive shafts which are cold drawn by the method shown in FIG. 1.
Figure 2B:
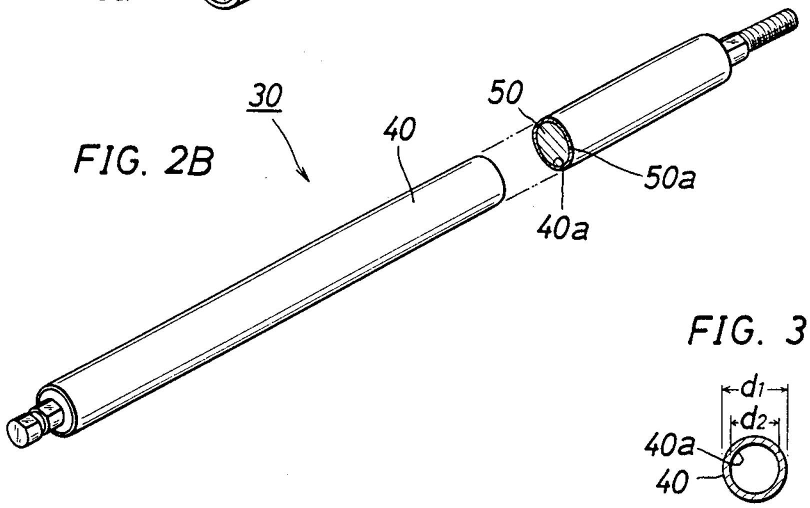

An inner periphery 40*a* of a seam welded outer stainless steel pipe (AISI 304) 40 as shown in FIG. 2A having hardness of HV 200-degree is subjected to acid treatment by the ordinary method to activate the internal composition thereof.

An outer periphery 50*a* of an aluminium solid bar 50 having hardness less than HV 90-degree is subjected to alkali cleaning by the activate conventional method to activate internal composition thereof.

Figure 1:
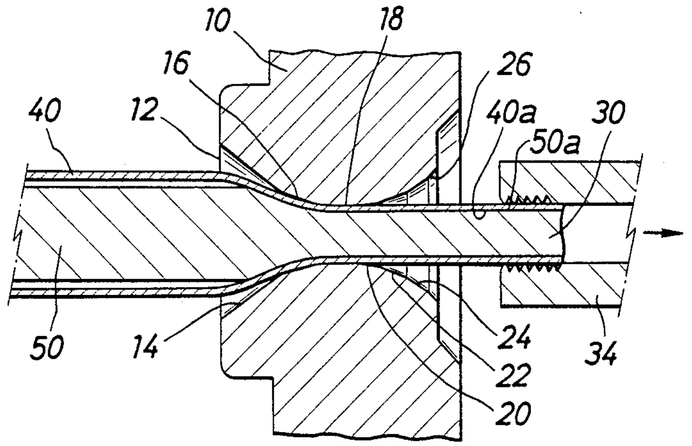
FIG. 1 is a partially diagrammatic sectional view of an example of this invention wherein an outer stainless steel pipe and an inner aluminium solid cylinder are forcedly cold drawn through a reducing die, and the inner aluminium solid cylinder is tightly adhered into a wrinkled inner periphery of the outer stainless steel pipe.

The aluminium solid bar 50 thus treated is inserted into a central opening of the stainless steel pipe 40, both of which are introduced into the inlet portion 12 of the reducing die 10. The front end of the stainless steel pipe 40 is gripped by the gripper 34 and cold drawn forcedly through the reducing die 10 in a direction shown by an arrow, as shown in FIG. 1.

Figure 2C:
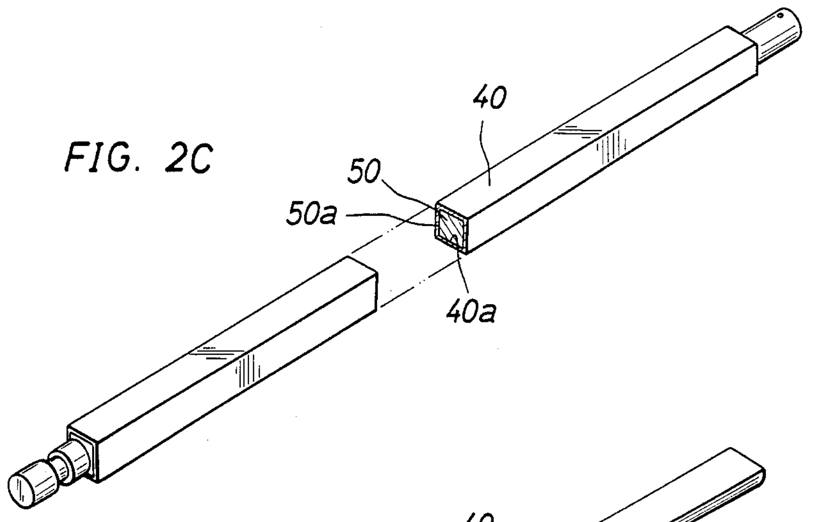
Figure 2D:
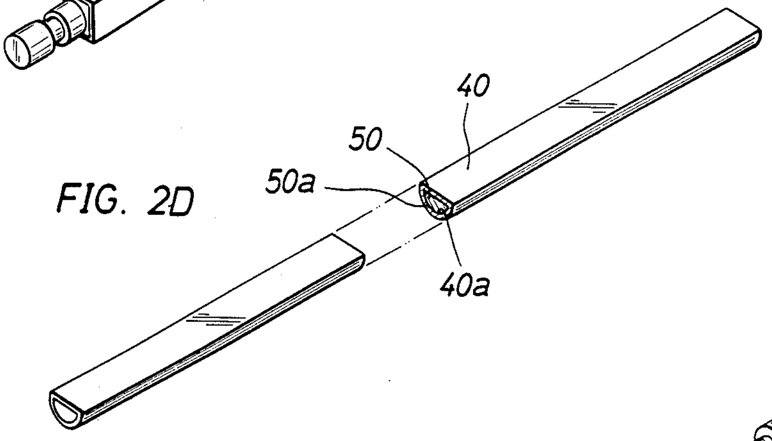
Figure 2E:
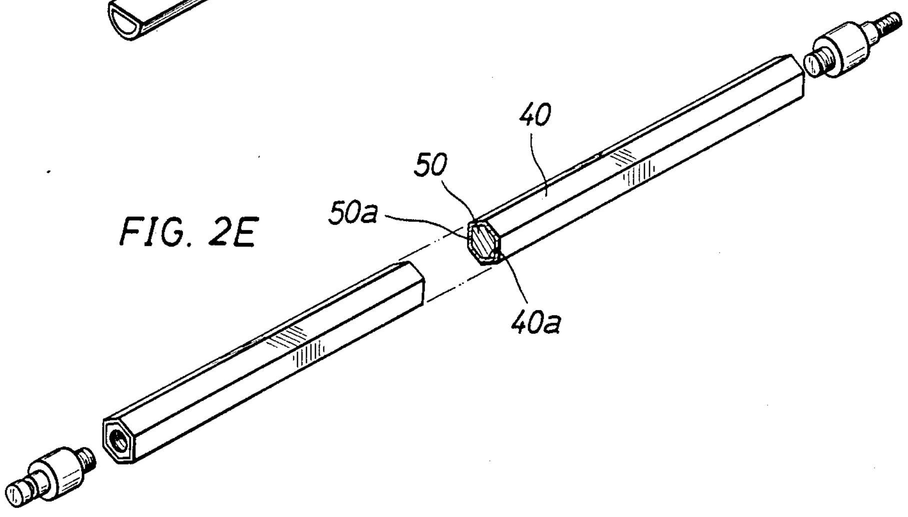

Through old drawing, the inner periphery 40*a* of the stainless steel pipe 40 is wrinkled, and the aluminium solid bar 50 is flarelessly and integrally joined into the wrinkled inner periphery 40*a* of the aluminium solid bar 50 so as to obtain an integrated light-weight solid shaft 30 shown in FIG. 28. Alternative shapes are shown in FIGS. 2C–2E.

Figure 4:
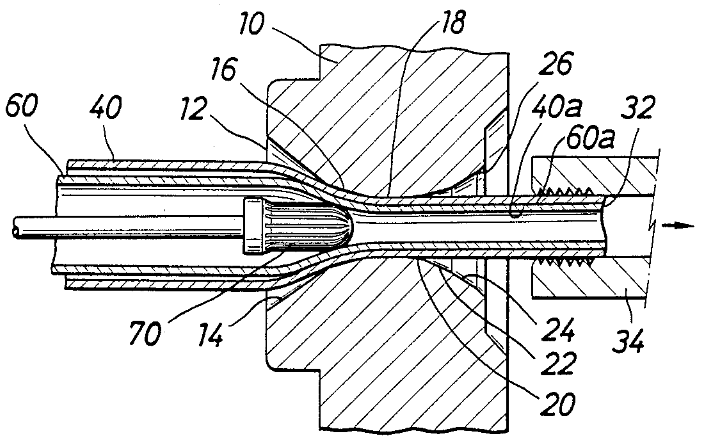
FIG. 4 is a partially diagrammatic sectional view of an example of this invention, wherein an outer stainless steel pipe and an inner aluminium pipe are forcedly cold drawn through a reducing die with a plug located within an inlet portion of the reducing die, and the inner aluminium pipe is integrally joined into a wrinkled inner periphery of the outer stainless steel pipe.
Figure 4A:
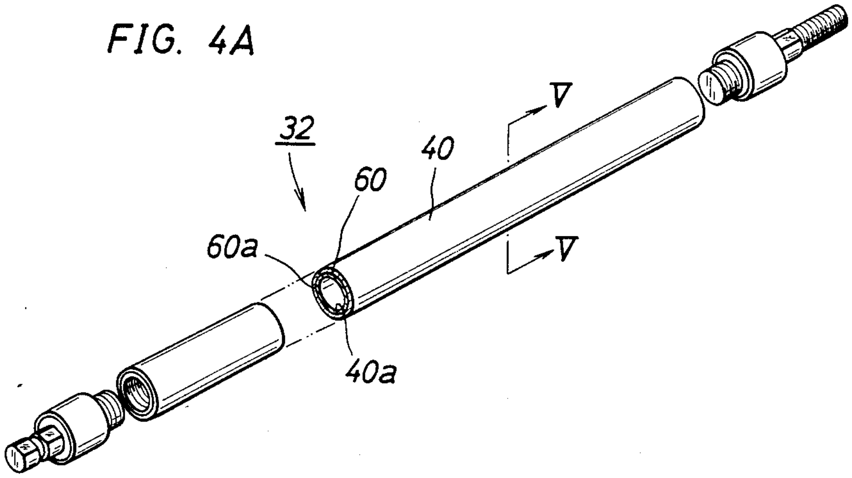
FIG. 4A is a perspective view, partly in cross section of the drive pipe shaft cold drawn by the method shown in FIG. 4.
Figure 5:
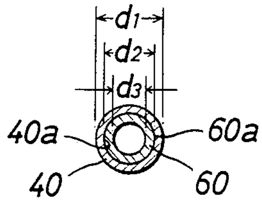
FIG. 5 is a sectional view of the drive pipe shaft cold drawn by the method shown in FIG. 4, taken along line V—V of FIG. 4.

In FIG. 4. the seam welded outer stainless steel pipe 40 and an aluminium pipe 60 which have been treated by the above-mentioned methods are introduced into the inlet portion 12 with a plug 70 located in a cylindrical reducing portion 18, and the outer stainless steel pipe 40 and an aluminium pipe 60 are forcedly cold drawn in a direction shown by an arrow with the front end portion of the outer pipe 40 being gripped by a gripper 34, thus obtaining an integrated light-weight pipe shaft 32 shown in FIG. 4A and FIG. 5. Accordingly, the aluminium pipe 60 Is tightly adhered into the rugged or wrinkled inner periphery 40*a* of the pipe 40.

When the seam welded outer stainless steel pipe 40 is cold drawn through the reducing area of the reducing die 10, the steel pipe 40 is radially pressed or squeezed from outward to form many longitudinal grooves or a wrinkled periphery 40*a* which develop into the outer periphery 60*a* of the inner aluminium pipe 60 after they have been cold drawn.

The reducing die 10 used in the cold drawing of this invention brings about the following characteristics.

a, a large thickness:

b, a large curvature:

c, a small deformed inner diameter after finished.

Through the simultaneous cold drawing of the seam welded stainless steel pipe 40 and the aluminium pipe 60, they are tightly adhered with each other. The difference between the outer steel pipe 40 having high hardness and the light-weight inner aluminium pipe 60 produces the following good results.

d, increased longitudinal grooves:

e, increased the adhesivity between AISl 304 pipe and Al pipe through the increased longitudinal grooves:

Finally achieved hardness:

AISl 304 outer pipe—more than HV 280 degree:

Al inner pipe—more than HV 110 degree:

Degressive ratio of the starting material to the finished solid or pipe shaft:

AISI 304 outer pipe—10.00%

Al inner pipe—14.00%

When the stainless steel outer pipe 40, the inner aluminium solid bar 50 or the aluminium pipe 60 are cold drawn through the reducing die 10, the aluminium solid bar 50 or the aluminium pipe 60 are tightly adhered into the wrinkled inner periphery 40*a* of the outer pipe 40 through plastic deformation.

When the outer pipe 40 and the inner aluminium solid bar 50 or the aluminium pipe 60 are tightly brought into contact and separated only on the order of each other with an angstrom unit, they are attracted to each other, thus causing severe dislocation of the internal composition within the neighboring portion of each bar or metal pipe, removing foreign substance on the surface and adhering them tightly.

As a result, high work hardening is obtained throughout the tightly united metal shaft.

CHARACTERISTIC FEATURE OF THE DRAWN SHAFTS

Deflection F of the solid shaft 30 can be obtained by the following equation.

$$F = \frac{PL}{EI}$$

wherein:

λ: constant:

P: load applied on the carriage 80:

L: length of the drive shaft:

E. Young's modulus:

I: moment of inertia:

d1: outer diameter of an outer pipe:

d2: inner diameter of an outer pipe:

d3: inner diameter of an inner pipe:

Moment of inertia I of the solid metal shaft 30 is obtained by the following equation.

$$I = \frac{\pi}{64} \{(d1 - d2) + d2\} = \frac{\pi}{64} d1$$

On the other hand, moment of inertia I of the metal pipe shaft 32 is obtained by the following equation.

$$I = \frac{\pi}{64}$$

Figure 7:
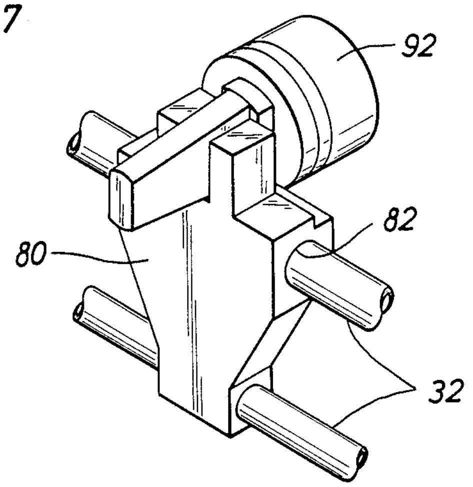
FIG. 7 is fragmentary perspective view of a print head and a carriage which are mounted in an electrically driven typewriter.

In FIG. 7, the metal pipe shaft 32 is inserted into into a central opening 82 of a carriage 80. As explained already, the aluminum inner pipe 60 is inserted into the seam welded stainless steel pipe (AISI 304) 40 which is tightly adhered onto the wrinkled inner periphery 40*a* of the stainless steel pipe 40.

Moment of inertia I of the pipe shaft 32 having a central, longitudinal opening with an inner diameter d2 is small, but it has a large deflection.

It should be noted that when the stainless steel pipe 40 together with the inner aluminium solid bar 50 or with the aluminium pipe 60 are forcedly cold drawn through the reducing die 10, they are tightly adhered or united with each other through metallurgical phenomona such as diffusion deposit and dislocation of internal composition within the outer and inner shaft.

More particularly, when there is a portion having an unequivalent density within a substance, there occurs a dislocation of atoms within the substance. When a solvent A is dissolved in a solution B and there is an unequivalent density within the solution B, the solvent A travels in the solution B in order to unify the density thereof, thus causing diffusion.

When a substance changes into another state, it usually needs high energy. Unlike gas or fluid, it needs great energy for solid metal in order to change into another state.

Figure 10:
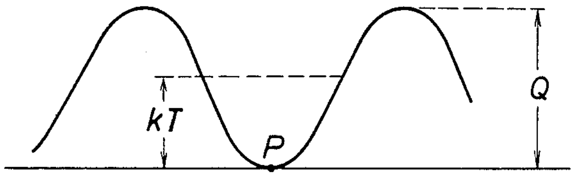
FIG. 10 is a diagram showing the diffusion phenomenon between two integrally adhered metals, especially showing the relationship between an atom and a potential energy for adhering one metal into another metal.

In FIG. 10, it is shown that a metal atom P is in an equilibrium state of energy. When the atom P goes beyond a top Q of a curve at a temperature T with kinetic energy kT (wherein K designates Boltzmann's constant) and $Q < kT$, it can cross beyond the top Q of the curve. But when it is otherwise, the atom P cannot cross beyond the top Q of the curve.

From the aforementioned equations, it can be well understood that moment of inertia I of each of the solid metal shaft 30 and the metal pipe shaft 32 increases in accordance with the thickness of the light weight solid bar 50 or the light-weight pipe shaft 60 which is tightly adhered into the outer metal pipe 40 so that deflection F of the drive shaft can be greatly decreased.

When aluminium is used either for the solid bar 30 or the pipe shaft 32, Young's modulus E decreases, but deflection F increases.

According to this invention, the rugged or wrinkled periphery is formed on the inner periphery 40*a* of the outer steel pipe 40 and on the outer periphery 50*a* of the solid bar 50 and also on the outer periphery 60*a* of the pipe shaft 50 so that when the solid bar 50 and the pipe shaft 60 are cold drawn through the reducing die 10, they are tightly adhered with each other.

Consequently, rigidity of the outer steel pipe (A1S1 304) 40 having a large Young's modulus plays an important role in compensating the decreased Young's modulus of the inserted solid metal shaft 50 and the pipe shaft 60.

Young's modulus of steel is 220×10 kg/cm, and that of aluminium is 66×10 kg/cm.

Investigating resonance, the frequency ω of the drive shaft is obtained by the following equation.

$$\omega = \sqrt{\frac{192\,EI}{PL}}$$

When vibration is closely akin to the frequency ω produced at the time of printing, there occurs resonance.

The natural frequency of the pipe drive shaft 32 made by the method of this invention is increased with an increase of the term EI so that it is caused to differ from minor vibration of the carriage 80 in order to avoid resonance thereof.

Figure 8:
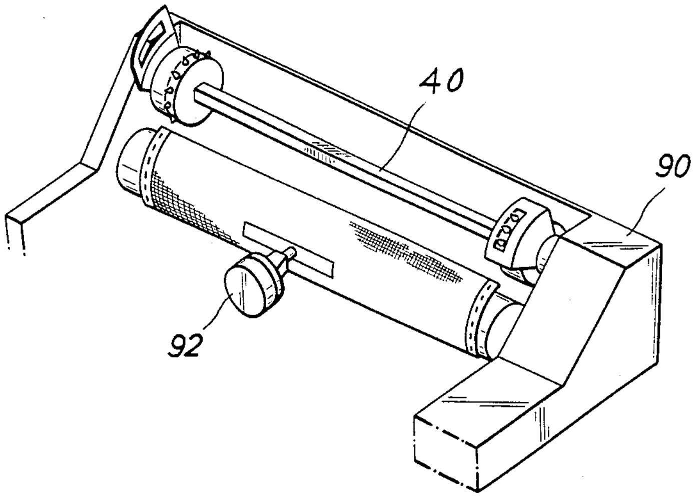
FIG. 8 is a fragmentary perspective view of a paper feeding device, especially showing a paper feed roller of a print head.

As described in the foregoing paragraphs, the weight of the drive shaft 40 used for mounting a print head 92 of a printer 90 shown in FIG. 8 has been lightened by about ½ and a diameter of the drive shaft can be as small as possible. At the same time, use of aluminium for the inner solid bar or inner pipe decreases the cost of production of the integrated drive shaft which can be driven with very low noise.

In addition, with the integral unity of the different metals such as the outer metal pipe (A1S1 304) and the inner solid shaft or pipe (A1) and also with the difference of elasticity caused by temperature change, there occurs a reduction of physical strength through clearance.

However, an inner light-weight metal such as aluminium 50 or 60 is tightly inserted into the rugged or wrinkled periphery 40*a* of the stainless steel pipe 40 so that the neighbouring layer each one of the two metals are impregnated with each other in order to increase work hardening and physical strength.

Furthermore, an end bearing portion on each one of the inner solid bar 50 or inner pipe 60 can be directly machined or threaded for easy engagement with gears of a housing of a print head, the center of the drive shaft can be obtained accurately and the fixing force is increased.

Figure 9:
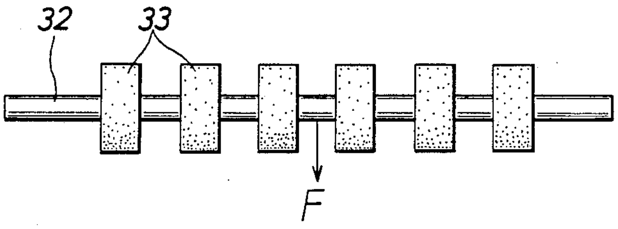
FIG. 9 is a front elevation of a pipe drive shaft which is used as a paper feed roller.

As shown in FIG. 9, the pipe drive shaft 32 can be provided with a plurality of rubber rollers 33 at equal distances.

While the present invention has been described in terms of its preferred embodiment, it is to be understood that the invention is not limited thereto but may be otherwise embodied within the scope of the following claims.

What is claimed is:

1. A method of manufacturing an integrated lightweight solid metal shaft for use in a business machine which comprises:

a step of subjecting to acid treatment an inner periphery of a seam welded outer metal pipe having high hardness;

a step of subjecting to alkali cleaning an external periphery of an inner cylindrical member having both low hardness and weight;

inserting said inner cylindrical member into said outer metal pipe;

a step of cold drawing forcedly the thus assembled outer metal pipe and said inner cylindrical member through a reducing die in order to wrinkle the inner periphery of said outer metal pipe and then integrate tightly said solid cylindrical bar onto the wrinkled inner periphery of said outer metal pipe through plastic deformation of said outer metal pipe and said solid cylindrical bar, internal pressure in said outer metal pipe and said inner cylindrical member and internal heat in said outer metal pipe and said inner cylindrical member caused by plastic deformation.

2. A method of manufacturing an integrated lightweight solid metal shaft for use in a business machine which comprises:

a step of subjecting to acid treatment an inner periphery of a seam welded outer metal pipe having high hardness;

a step of subjecting to alkali cleaning an external periphery of an inner pipe having both low hardness and weight;

inserting said inner pipe into said outer metal pipe;

a step of cold drawing forcedly the thus assembled outer metal pipe and said inner pipe through a reducing die with a plug located at an inlet portion of said die in order to wrinkle said inner periphery and integrate tightly said inner pipe onto the wrinkled inner periphery of said outer metal pipe through plastic deformation of said outer metal pipe and said inner pipe, internal pressure between said outer metal pipe and said inner pipe and internal heat in said outer metal pipe and said inner pipe caused by plastic deformation.

3. A method of manufacturing an integrated lightweight solid metal shaft for use in a business machine which comprises:

a step of subjecting to acid treatment an inner periphery of a seam welded outer metal pipe having high hardness;

a step of subjecting to alkali cleaning an external periphery of a solid cylindrical bar having both low hardness and weight;

inserting said solid cylindrical bar into said outer metal pipe;

a step of cold drawing forcedly the thus assembled outer metal pipe and said solid cylindrical bar through a reducing die in order to wrinkle said inner periphery and integrate tightly said solid cylindrical bar onto the wrinkled inner periphery of said outer metal pipe through plastic deformation of said outer metal pipe and said solid cylindrical bar, internal pressure between said outer metal pipe and said solid cylindrical bar and internal heat in said outer metal pipe and said solid cylindrical bar caused by plastic deformation.

* * * * *